United States Patent [19]

Imai

[11] 4,400,013
[45] Aug. 23, 1983

[54] SAFETY SEAT BELT SYSTEM

[75] Inventor: Hironobu Imai, Chigasaki, Japan

[73] Assignee: NSK-Warner K.K., Tokyo, Japan

[21] Appl. No.: 274,770

[22] Filed: Jun. 18, 1981

[30] Foreign Application Priority Data

Jun. 24, 1980 [JP] Japan ............................ 55-88275[U]

[51] Int. Cl.³ ............................................ B60R 21/10
[52] U.S. Cl. .................................. 280/801; 280/807; 280/808; 297/475
[58] Field of Search ............... 280/801, 802, 803, 804, 280/807, 808, 806, 805; 297/474, 475, 476, 479, 483, 481, 468

[56] References Cited

U.S. PATENT DOCUMENTS 3,820,842  6/1974  Stepenson .............................. 297/483
3,860,261  1/1975  Takada ................................ 280/807
3,885,812  5/1975  DeLavenne ......................... 280/806
4,193,613  3/1980  Cachia ................................ 280/804

*Primary Examiner*—David M. Mitchell
*Assistant Examiner*—Joseph G. McCarthy
*Attorney, Agent, or Firm*—Lane, Aitken & Kananen

[57] ABSTRACT

A safety seat belt system for use in a vehicle in which an upper end section of its webbing is made narrower to allow the use of a compact retractor that can be placed in the center pillar of the vehicle. In order to prevent the narrower upper section to be extended over the torso of the occupant when worn by the occupant and to safely restrain the torso by the remaining broader webbing section, at least two guide members are provided to guide the webbing between the retractor and relevant shoulder of the occupant. Owing to the compact structure of the retractor, it is suitable particularly for small cars.

2 Claims, 2 Drawing Figures

SAFETY SEAT BELT SYSTEM

BACKGROUND OF THE INVENTION

1. Field of the Invention

This invention relates to a safety seat belt system, particularly, to a safety seat belt system suitable for use in vehicle.

2. Description of the Prior Art

Motor vehicles are generally equipped with a safety seat belt system for protecting vehicle occupants at the time of emergency like a collision. The recent trend toward the economy of energy and natural resources is reflected by an increasing demand for motor vehicles of smaller size and weight. As a matter of course, the safety seat belt systems for smaller cars have various restrictions, for example, the limited mounting space. In this regard, various attempts have been made to provide a compact retractor for the webbing of the safety belt system.

One attempt is to vary the width of the webbing stored in the retractor from that of the restraining webbing section which is to be worn around the occupant. More particularly, the occupant-restraining webbing is generally required to be about 50 mm in width for suitably dispersing and absorbing the impact force as applied to the occupant at the time of a sudden deceleration. Its width may gradually be reduced in the intermediate section and finally to, for example, about 25 mm in the stored section which is received in the retractor, thereby permitting to reduce the size and weight of the retractor and thus the mounting space of the retractor commensurately with the reduction in the webbing width in the storing section.

However, in a safety seat belt system using a continuous webbing which integrally consists of a shoulder webbing for restraining the torso of a vehicle occupant and a lap webbing for restraining the front part of the lower trunk and thighs of the occupant, a substantial length of a narrow webbing section has to be extended from the retractor in order to encircle a restraining body portion (normally the torso) of the occupant so that the narrow webbing section may extend over the restraining body portion and there is thus a possibility of the webbing failing to protect the occupant by sufficiently dispersing the impact force which would be imposed on the occupant by a sudden change in the vehicle speed as in the case of a collision. Restraint of the occupant by a broad webbing naturally results in a shorter length of the narrower webbing section and a difficulty of taking up the extended broad webbing section in the retractor in an unrestraining state, leaving on the seat a lengthy webbing untidily which might get in the way of the occupant when getting on and off the vehicle or block the viewfield to cause a trouble at the time of safety confirmation or the like.

SUMMARY OF THE INVENTION

With the foregoing in view, a primary object of this invention is to provide a safety seat belt system for a vehicle which includes a shoulder webbing, an upper end portion of the shoulder webbing being adapted to be releasably wound up on a retractor but, when worn by an occupant, said shoulder webbing being extended to restrain the torso of the occupant, and the upper end portion of said webbing being formed narrower than the rest of the webbing. The system further comprises at least two guide members for threadingly guiding said webbing between said retractor and the relevant shoulder of said occupant without allowing said narrower end portion of the webbing to extend over the occupant. Accordingly, the occupant is safely protected by the rest of the webbing, namely, broader webbing section in the event of a sudden deceleration of the vehicle. The shoulder webbing is preferably continuous with a lap webbing, thereby forming a lap-shoulder continuous webbing.

Further objects and advantages of the present invention will readily occur to those skilled in the art to which the invention pertains upon reference to the following detailed description.

DETAILED DESCRIPTION OF THE PREFERRED EMBODIMENTS OF THE INVENTION

Figure 1:
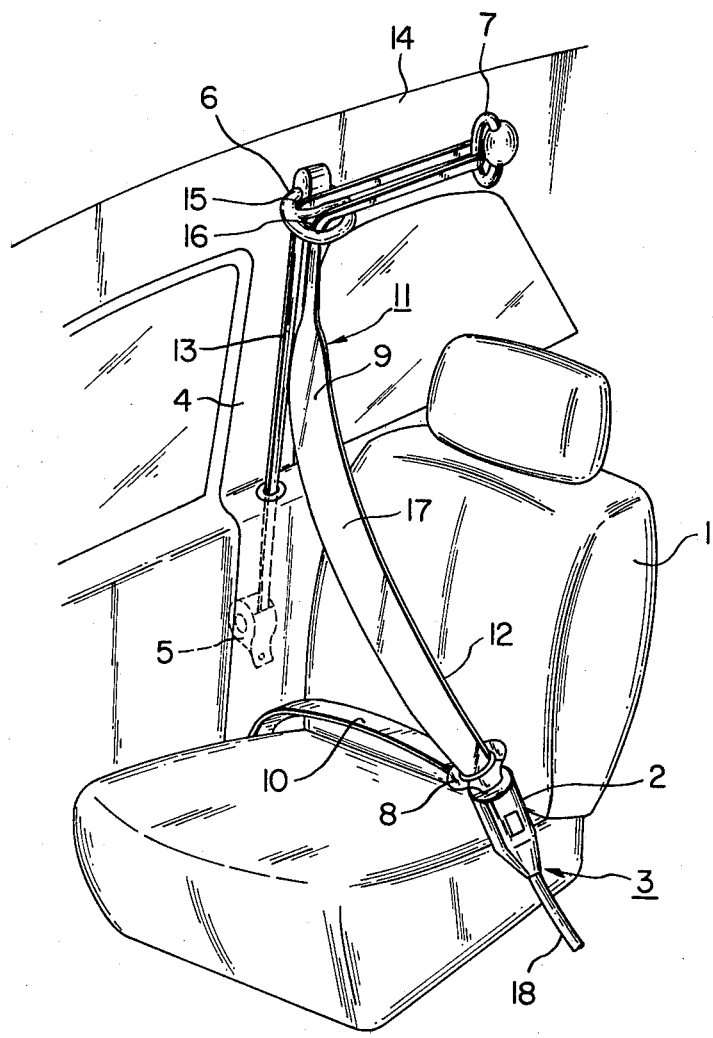
FIG. 1 is a diagrammatic illustration of the first embodiment of the present invention.

Referring to FIG. 1, there is diagrammatically shown a first embodiment of the invention, in which the safety belt system includes an inner belt 3 and an outer continuous belt 11. The inner belt 3 consists of a buckle 2 and anchor wire 18 and is firmly secured to a vehicle floor at a position inside a seat 1. The continuous outer belt 11 includes an emergency-lock type retractor 5 securely mounted on a side panel at a lower position in the center pillar 4 of a vehicle body, double-hole through ring 6, single-hole through ring 7, tongue 8, and a continuous webbing consisting of shoulder webbing section 9 and lap webbing section 10. As the energency-lock type retractor 5, it is possible to use such a seat belt retractor as disclosed in U.S. Pat. No. 4,083,511 issued Apr. 11, 1978 to Haruyuki Ikesue and assigned to the same assignee, NSK-Warner K. K. as in the present case.

The continuous webbing 12 includes a narrow webbing section 13 and a broad webbing section 17. An end portion of the narrow webbing section 13 is adapted to be releasably wound up on the emergency-lock type retractor 5, whereby allowing to reduce in size the emergency-lock type retractor 5. The shoulder webbing section 9 extends from the retractor 5, through the double-hole through ring 6, the single-hole through ring 7 and again the double-hole through ring 6, to the tongue 8. The lap webbing section 10 is secured to the vehicle floor at a position outside the seat 1 by an anchor plate.

The continuous webbing 12 which extends from the retractor 5 is guided rearward of the vehicle body through a first hole 15 of the double-hole through ring 6 which is provided on the side roof 14 above the center pillar 4, reversed through the single-hole through ring 7 located in a rear position of the side roof 14, and then guided downward through a second hole 16 of the double-hole through ring 6. The guide portions of both double- and single-hole through rings 6 and 7 are so constructed as to permit both narrow webbing section 13 and broad webbing section 17 of the continuous webbing 12 to pass therethrough.

With the first embodiment of the above-described arrangement, as the occupant on the seat 1 inserts the tongue 8 into the buckle 2,, the continuous webbing 12 is extended out of the retractor 5 according to the body size of the occupant as shown in FIG. 1 (the occupant being omitted in the illustration), restraining the torso and lap areas of the occupant respectively by the shoulder and lap webbing sections 9 and 10 which are defined by the tongue 8. In this case, since the narrow webbing section 13 is guided through the double-hole through ring 6, the single-hole through ring 7 and again the double-hole through ring 6, the narrow webbing section 13 may not be extended to the torso of even a corpulent or stout occupant. In case of emergency, the extensile movement of the shoulder webbing 9 from the retractor 5 is inhibited so that the impact is absorbed by the broad webbing section 17 to prevent the secondary collision of the occupant against the steering wheel or other rigid structure of the vehicle.

When the occupant disengages the tongue 8 from the buckle 2 to get off the vehicle, the continuous webbing 12 is taken up by the retractor 5 from the narrow webbing section 13 of the shoulder webbing 9. Therefore, the broad webbing section 17 which is continuous to the narrow webbing section 13 is also retracted successively through the second hole 16 of the double-hole through ring 6 and the single-hole through ring 7 toward the first hole 15 of the double-hole through ring 6.

In this instance, since the narrow webbing section 13 of the continuous webbing 12 is guided through the first and second through rings 6 and 7 and thus has a sufficient length for taking up the entire length of the extended continuous webbing 12, the fore end of the broad webbing section 17 is prevented from being taken into the retractor 5 and, thus, subsequent extending or winding operation of the continuous webbing 12 can be done smoothly.

When the extended section of the continuous webbing 12 is retracted back in its entirety into the stored position, the broad webbing section 17 is extended along the center pillar 4 from the anchor plate fixed on the vehicle floor at a position outside the seat 1 to the double-hole through ring 6 and folded back through the rearwardly positioned single-hole through ring 7 toward the double-hole through ring 6, the continuous webbing 12 forming the narrow webbing section 13 after the double-hole through ring 6 and being taken up by the retractor 5. Therefore, there is no possibility of the continuous webbing 12 being left in a slackened state or getting into the way of the occupant when getting on or off the vehicle.

Figure 2:
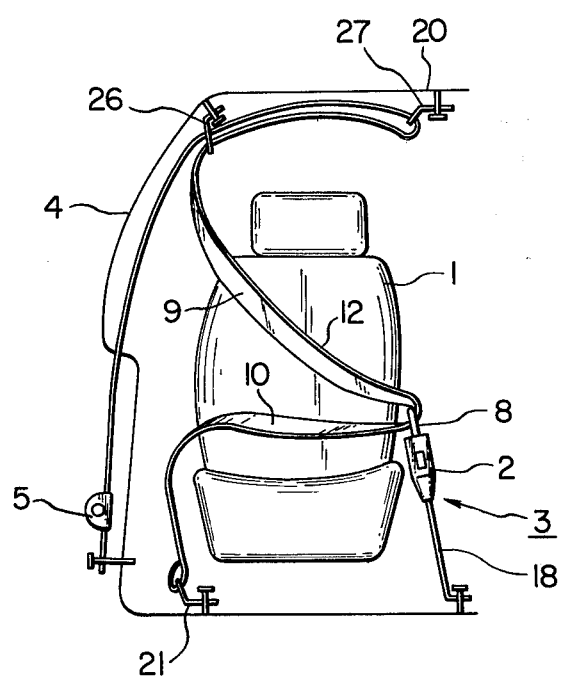
FIG. 2 is a diagrammatic view of the second embodiment of the invention.

Reference is now had to FIG. 2 which shows a second embodiment of the invention employing a single-hole through-ring at the roof center of the vehicle body. As shown, one end of the continuous webbing 12 of this embodiment is likewise wound on a small, emergency-lock type retractor 5. The other end of the continuous webbing 12 is guided through a double-hole through ring 26 and along the roof of the vehicle body to a single-hole through ring 27 which is provided at the roof center, the continuous webbing 12 being folded back through the single-hole through-ring 27 and passed again through the double-hole through ring 26. After the double-hole through ring 26, the other end of the webbing 12 is secured to an anchor plate 21 fixedly secured on the vehicle floor at a position outside the seat 1 through a a tongue 8.

This embodiment in which the single-hole through ring 27 is located at the roof center 20 has an advantage in that the length of the guide passage for the shoulder webbing 9 can be made longer than in the foregoing embodiment.

Although the foregoing description has been directed to a safety seat belt system using a continuous webbing consisting of shoulder and lap webbing sections, it is to be understood that the invention is also applicable to a seat belt system in which the shoulder and lap webbing sections are discontinuous and the inner ends of the shoulder and lap webbing sections are secured to the tongue.

It is preferable to provide the double-hole through ring 6 with an emergency-lock mechanism so as to grippingly lock the narrow webbing section 13 of the shoulder webbing section 9 in the vicinity of the relevant shoulder of the occupant in the event of emergency thereby reducing the elongation of the webbing for secure restraint of the occupant. Examples of such an emergency-lock mechanism are disclosed in U.S. Pat. No. 3,205,004 issued Sept. 7, 1965 to Eric Herbert Spouge; U.S. Pat. No. 3,439,932 issued Apr. 22, 1969 to Gerald F. Lewis et al.; U.S. Pat. No. 4,128,261 issued Dec. 5, 1978 to Hannu O. Paitula.

As clear from the foregoing description, the safety seat belt system according to the present invention employing a continuous webbing of a varying width permits to use a retractor of a small size while restraining the occupant by the broad webbing section to ensure sufficient absorption of impact force.

What is claimed is:

1. In a safety seat belt system for a vehicle including a shoulder webbing, an upper end portion of the shoulder webbing being adapted to be releasably wound up on a retractor, but, when worn by an occupant, said shoulder webbing being extended to restrain the torso of the occupant, the improvement comprising said upper end portion of the webbing being formed narrower than the rest of the webbing, and said system further including at least two guide members for threadingly guiding said webbing between said retractor and the relevant shoulder of said occupant without allowing said narrower end portion of the webbing to extend over the occupant, a lap webbing which is continuous with said should webbing thereby forming a lap shoulder continuous webbing, a first one of said guide members being located at an upper portion of a central pillar of the vehicle and said second one guide members being spaced from the first guide member in a direction substantially perpendicular to the longitudinal axis of the vehicle and being secured on the inner wall of the roof of the vehicle.

2. The safety seat belt system as defined in claim 1, wherein said first guide member is provided with a guide portion comprising means of threadingly guiding therethrough said shoulder webbing twice.

* * * * *